United States Patent
Bublitz et al.

(10) Patent No.: US 7,392,592 B2
(45) Date of Patent: Jul. 1, 2008

(54) RUGGEDIZED LASER LEVEL

(75) Inventors: Scott Bublitz, Waukesha, WI (US); Jonathan Zick, Waukesha, WI (US); Melissa Ottens-Rendon, Waukesha, WI (US); David Duecker, Middleton, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 11/539,787

(22) Filed: Oct. 9, 2006

(65) Prior Publication Data

US 2007/0130785 A1 Jun. 14, 2007

Related U.S. Application Data

(60) Provisional application No. 60/725,106, filed on Oct. 7, 2005.

(51) Int. Cl.
G01C 15/02 (2006.01)
G01C 5/00 (2006.01)
(52) U.S. Cl. ....................................................... 33/290
(58) Field of Classification Search .................. 33/290, 33/281, 282, 283, 285, 286, 291
See application file for complete search history.

(56) References Cited

U.S. PATENT DOCUMENTS

| | | | |
|---|---|---|---|
| 4,031,629 A | 6/1977 | Paluck | |
| 4,035,084 A | 7/1977 | Ramsay | |
| 4,221,483 A | 9/1980 | Rando | |
| 4,231,160 A | 11/1980 | Johnson et al. | |
| 4,333,242 A | 6/1982 | Genho, Sr. | |
| 4,674,188 A | 6/1987 | Fisher | |
| 4,718,171 A | 1/1988 | Schlemmer et al. | |
| 4,836,669 A | 6/1989 | Teach | |
| 4,889,997 A | 12/1989 | Tomiolo | |
| 4,973,158 A | 11/1990 | Marsh | |
| 4,988,192 A | 1/1991 | Knittel | |
| 5,108,177 A | 4/1992 | Middleton | |
| 5,144,487 A | 9/1992 | Hersey | |
| 5,163,229 A | 11/1992 | Cantone | |
| 5,182,863 A | 2/1993 | Rando | |
| 5,212,889 A | 5/1993 | Lysen | |
| 5,243,398 A | 9/1993 | Nielsen | |
| 5,248,217 A | 9/1993 | Smith | |
| 5,285,708 A | 2/1994 | Bosten et al. | |
| 5,287,627 A | 2/1994 | Rando | |
| 5,367,779 A | 11/1994 | Lee | |
| 5,375,495 A | 12/1994 | Bosten et al. | |

(Continued)

OTHER PUBLICATIONS

Porter Cable Advertisement on HandyMagazine.com dated Nov./Dec. 2003.

(Continued)

Primary Examiner—Christopher W Fulton
(74) Attorney, Agent, or Firm—Michael Best & Friedrich LLP

(57) ABSTRACT

A ruggedized laser level. The laser level includes a housing, a base, a protective structure, and a laser assembly. The base and protective structure combine to protect the laser level from damage due to being dropped or impacted. The laser assembly can provide a 360° beam or a five point dot. Some embodiments of the laser level include a plurality of power tool battery charging circuits.

20 Claims, 12 Drawing Sheets

U.S. PATENT DOCUMENTS

| | | |
|---|---|---|
| 5,400,514 A | 3/1995 | Imbrie et al. |
| 5,485,266 A | 1/1996 | Hirano et al. |
| 5,501,018 A | 3/1996 | Porter |
| 5,502,898 A | 4/1996 | Manore |
| 5,519,942 A | 5/1996 | Webb |
| D371,309 S | 7/1996 | Webb |
| 5,531,031 A | 7/1996 | Green |
| 5,533,268 A | 7/1996 | Keightley |
| 5,561,911 A | 10/1996 | Martin |
| 5,566,459 A | 10/1996 | Breda |
| 5,572,796 A | 11/1996 | Breda |
| 5,604,987 A | 2/1997 | Cupp |
| 5,610,711 A | 3/1997 | Rando |
| 5,619,802 A | 4/1997 | Rando et al. |
| 5,621,975 A | 4/1997 | Rando |
| 5,636,018 A | 6/1997 | Hirano et al. |
| 5,655,307 A | 8/1997 | Ogawa et al. |
| D389,758 S | 1/1998 | Motamed |
| 5,738,595 A | 4/1998 | Carney |
| 5,742,387 A | 4/1998 | Ammann |
| 5,754,582 A | 5/1998 | Dong |
| 5,782,003 A | 7/1998 | Bozzo |
| 5,784,792 A | 7/1998 | Smith |
| 5,799,403 A | 9/1998 | Schrum |
| 5,819,424 A | 10/1998 | Ohtomo et al. |
| 5,836,081 A | 11/1998 | Orosz, Jr. |
| 5,838,431 A | 11/1998 | Hara et al. |
| 5,841,527 A | 11/1998 | Shibuya et al. |
| D402,218 S | 12/1998 | Kennison |
| 5,852,493 A | 12/1998 | Monnin |
| 5,872,657 A | 2/1999 | Rando |
| D409,508 S | 5/1999 | Gallagher |
| D411,470 S | 6/1999 | Webb |
| 5,907,907 A | 6/1999 | Ohtomo et al. |
| 5,914,778 A | 6/1999 | Dong |
| D412,857 S | 8/1999 | Howard et al. |
| D415,436 S | 10/1999 | Martone |
| 5,966,826 A | 10/1999 | Ho |
| 5,978,076 A | 11/1999 | Kitajima |
| 5,992,029 A | 11/1999 | Dong |
| 5,994,688 A | 11/1999 | Jackson et al. |
| D418,432 S | 1/2000 | Krantz |
| D418,434 S | 1/2000 | Krantz |
| 6,009,630 A | 1/2000 | Rando |
| 6,014,211 A | 1/2000 | Middleton et al. |
| 6,035,540 A | 3/2000 | Wu et al. |
| 6,037,874 A | 3/2000 | Heironimus |
| 6,040,897 A | 3/2000 | Clifford et al. |
| 6,043,879 A | 3/2000 | Dong |
| 6,055,046 A * | 4/2000 | Cain ............................ 33/291 |
| 6,065,217 A | 5/2000 | Dong |
| 6,073,353 A | 6/2000 | Ohtomo et al. |
| 6,098,297 A | 8/2000 | Belfiore |
| 6,133,996 A | 10/2000 | Plumb et al. |
| 6,151,787 A | 11/2000 | Wright et al. |
| 6,167,630 B1 | 1/2001 | Webb |
| 6,177,987 B1 | 1/2001 | Ting |
| 6,184,979 B1 | 2/2001 | Hirano et al. |
| 6,195,901 B1 | 3/2001 | Falb |
| 6,209,832 B1 | 4/2001 | Yamazaki |
| 6,249,983 B1 | 6/2001 | Wright et al. |
| 6,253,457 B1 | 7/2001 | Ohtomo et al. |
| 6,256,895 B1 | 7/2001 | Akers |
| 6,262,801 B1 | 7/2001 | Shibuya et al. |
| RE37,318 E | 8/2001 | Porter |
| 6,308,059 B1 * | 10/2001 | Domes ....................... 455/351 |
| 6,314,651 B1 | 11/2001 | Ohtomo et al. |
| 6,324,455 B1 | 11/2001 | Jackson |
| 6,339,468 B1 | 1/2002 | Clifford et al. |
| 6,360,446 B1 | 3/2002 | Bijawat et al. |
| D455,664 S | 4/2002 | Webb |
| D457,446 S | 5/2002 | Kallabis |
| D460,924 S | 7/2002 | Hitchcock |
| D461,135 S | 8/2002 | Watson et al. |
| 6,427,347 B1 | 8/2002 | Butler, Sr. |
| 6,439,888 B1 | 8/2002 | Boutoussov et al. |
| 6,449,294 B1 | 9/2002 | Boutoussov |
| 6,449,856 B1 | 9/2002 | Matsumoto et al. |
| D464,578 S | 10/2002 | Zurwelle |
| 6,459,483 B1 | 10/2002 | Shafer et al. |
| 6,497,047 B1 | 12/2002 | Miyagawa et al. |
| D469,369 S | 1/2003 | Durkin |
| 6,532,676 B2 | 3/2003 | Cunningham |
| 6,539,638 B1 | 4/2003 | Pelletier |
| 6,542,304 B2 | 4/2003 | Tacklind et al. |
| 6,546,636 B2 | 4/2003 | Tamamura |
| D474,985 S | 5/2003 | Cooper et al. |
| 6,568,094 B2 | 5/2003 | Wu |
| D475,938 S | 6/2003 | Lopano |
| 6,577,388 B2 | 6/2003 | Kallabis |
| D476,584 S | 7/2003 | Zurwelle |
| 6,588,115 B1 | 7/2003 | Dong |
| 6,598,304 B2 | 7/2003 | Akers |
| 6,606,798 B2 | 8/2003 | El-Katcha et al. |
| 6,625,895 B2 | 9/2003 | Tacklind et al. |
| 6,657,788 B2 | 12/2003 | Tacklind et al. |
| 6,675,489 B2 | 1/2004 | Ohtomo et al. |
| 6,688,009 B2 | 2/2004 | Haijima et al. |
| 6,688,011 B2 | 2/2004 | Gamal et al. |
| 6,691,420 B2 | 2/2004 | Tamamura |
| 6,694,630 B2 | 2/2004 | Dang et al. |
| 6,708,414 B2 | 3/2004 | Clinton |
| 6,710,929 B2 | 3/2004 | Phuly et al. |
| 6,722,048 B2 | 4/2004 | Huang et al. |
| 6,724,471 B2 | 4/2004 | Feist et al. |
| 6,741,343 B2 | 5/2004 | Shafer et al. |
| 6,751,879 B1 | 6/2004 | Pu |
| 6,763,596 B1 * | 7/2004 | Puri et al. ..................... 33/286 |
| 6,915,583 B2 | 7/2005 | El-Katcha et al. |
| 6,964,106 B2 | 11/2005 | Sergyeyenko et al. |
| 7,073,268 B1 * | 7/2006 | Etter et al. .................... 33/286 |
| 7,152,334 B2 * | 12/2006 | Gamal et al. .................. 33/290 |
| 7,167,500 B2 * | 1/2007 | Kallabis ....................... 33/286 |
| 7,237,341 B2 * | 7/2007 | Murray ........................ 33/286 |
| 2001/0025425 A1 | 10/2001 | Haijima et al. |
| 2001/0025426 A1 | 10/2001 | Fischer |
| 2001/0027611 A1 | 10/2001 | Clinton |
| 2001/0029675 A1 | 10/2001 | Webb |
| 2001/0034944 A1 | 11/2001 | Cunningham |
| 2001/0037579 A1 | 11/2001 | Akers |
| 2001/0049879 A1 | 12/2001 | Moore, Jr. |
| 2002/0017028 A1 | 2/2002 | Wishart |
| 2002/0073561 A1 | 6/2002 | Liao |
| 2002/0080342 A1 | 6/2002 | Kallabis |
| 2002/0108261 A1 | 8/2002 | Miller |
| 2002/0138997 A1 | 10/2002 | Ohtomo et al. |
| 2002/0144415 A1 | 10/2002 | Dang et al. |
| 2002/0162233 A1 | 11/2002 | El-Katcha et al. |
| 2002/0166249 A1 | 11/2002 | Liao |
| 2002/0174552 A1 | 11/2002 | Akers |
| 2002/0178595 A1 | 12/2002 | Tamamura |
| 2002/0178596 A1 | 12/2002 | Malard et al. |
| 2002/0184774 A1 | 12/2002 | Kim et al. |
| 2002/0186365 A1 | 12/2002 | Shafer et al. |
| 2003/0000094 A1 | 1/2003 | Tamamura |
| 2003/0009891 A1 | 1/2003 | Ohtomo et al. |
| 2003/0029048 A1 | 2/2003 | Huang et al. |
| 2003/0051355 A1 | 3/2003 | Phuly et al. |
| 2003/0066198 A1 | 4/2003 | Turner |
| 2003/0090234 A1 * | 5/2003 | Glasgow et al. ............. 320/107 |
| 2003/0101606 A1 | 6/2003 | Li |
| 2003/0106226 A1 * | 6/2003 | Tacklind et al. .............. 33/286 |
| 2003/0123153 A1 | 7/2003 | Ohtomo et al. |
| 2003/0145474 A1 | 8/2003 | Tacklind et al. |

| | | |
|---|---|---|
| 2003/0177652 A1 | 9/2003 | Sawaguchi |
| 2003/0229996 A1 | 12/2003 | Tamamura |
| 2003/0229997 A1 | 12/2003 | Gamal et al. |
| 2003/0231303 A1 | 12/2003 | Raskin et al. |
| 2004/0025358 A1 | 2/2004 | Jan et al. |
| 2004/0025359 A1 | 2/2004 | Tamamura |
| 2004/0031163 A1 | 2/2004 | El-Katcha et al. |
| 2004/0064959 A1 | 4/2004 | Kallabis |
| 2004/0078989 A1 | 4/2004 | Fai et al. |
| 2004/0083614 A1 | 5/2004 | Raskin et al. |
| 2004/0093748 A1 | 5/2004 | Watson et al. |
| 2004/0103546 A1 | 6/2004 | Marshall et al. |
| 2004/0107588 A1 | 6/2004 | Pu |
| 2004/0107589 A1 | 6/2004 | Ohtomo et al. |
| 2004/0111898 A1 | 6/2004 | Marshall et al. |
| 2004/0117995 A1 | 6/2004 | Reed et al. |
| 2005/0267776 A1* | 12/2005 | Selby et al. .................... 705/1 |
| 2005/0274030 A1* | 12/2005 | Spanski et al. ................ 33/286 |

OTHER PUBLICATIONS

Porter Cable Press Release on www.portercable.com dated May 1, 2002 2 Pages.
DeWalt Search Results for 'laser' on www.dewalt.com dated Apr. 23, 2004.
DeWalt Press Release on www.dewalt.com dated Apr. 23, 2004.
DeWalt Product Description for a 'Manually Leveled Rotary Laser' on www.dewalt.com dated Apr. 23, 2004 2 Pages.
DeWalt Product Descriptions for 'Lasers & Instruments' on www.dewalt.com dated Apr. 23, 2004.
DeWalt Product Description for 'Self-Leveling Rotary Lasers' on www.dewalt.com dated Apr. 23, 2004 2 Pages.
DeWalt Product Description for 'Optical Instruments' on www.dewalt.com dated Apr. 23, 2004.
DeWalt Product Description for another 'Optical Instruments' on www.dewalt.com dated Apr. 23, 2004 2 Pages.

* cited by examiner

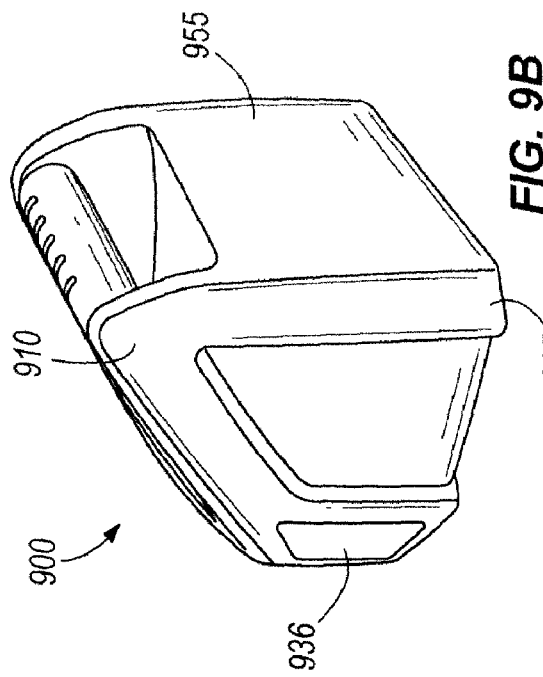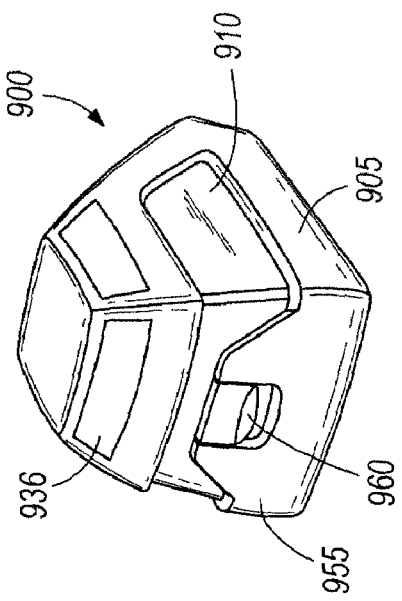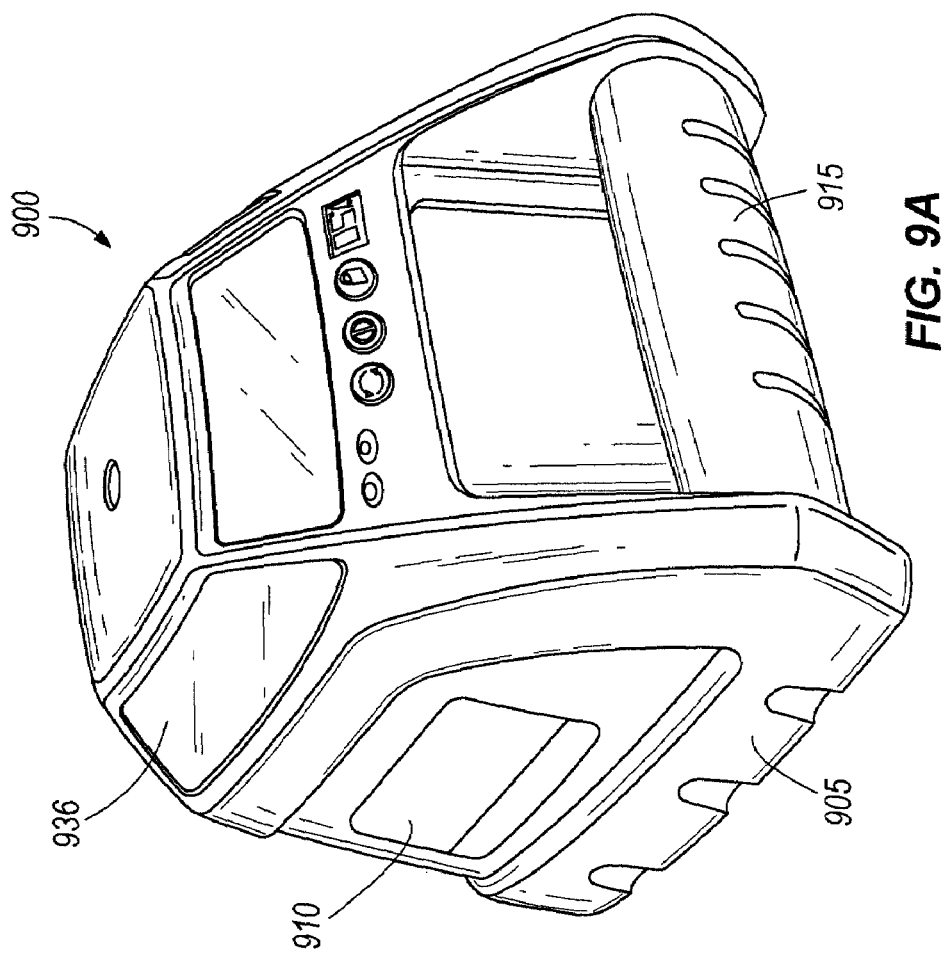

RUGGEDIZED LASER LEVEL

RELATED APPLICATION

This application claims priority to U.S. Provisional Patent Application Ser. No. 60/725,106, filed Oct. 7, 2005, the entire contents of which are incorporated herein by reference.

BACKGROUND

Laser levels are used by electricians, interior framing contractors, mechanical contractors, steel erectors, and the like. A laser level may be used by personnel working on the exterior or the interior of a work area and may be operated in different environments.

SUMMARY

In one embodiment, the invention provides a laser level including a housing, a protective structure, at least one light source, and at least one indicator. The protective structure is associated with the housing and protects the laser level from an impact. The light source is supported by the housing and projects at least one beam of visible light onto a surface external to the laser level. The indicator denotes a position of the housing relative to a vertical plane and a horizontal plane.

In another embodiment, the invention provides a battery charger including a housing, a power cord, a charging circuit, and a light source. A battery that is removably interfaced with the battery charger is supported by the housing. The housing also supports the charging circuit, which is electrically connectable to a power source and to the battery. The charging circuit provides a charging current to the battery. The light source projects at least one beam of visible light onto an external surface.

Other aspects of the invention will become apparent by consideration of the detailed description and accompanying drawings.

BRIEF DESCRIPTION OF THE DRAWINGS

FIGS. 9A-9C illustrate perspective views of an embodiment of a laser level.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
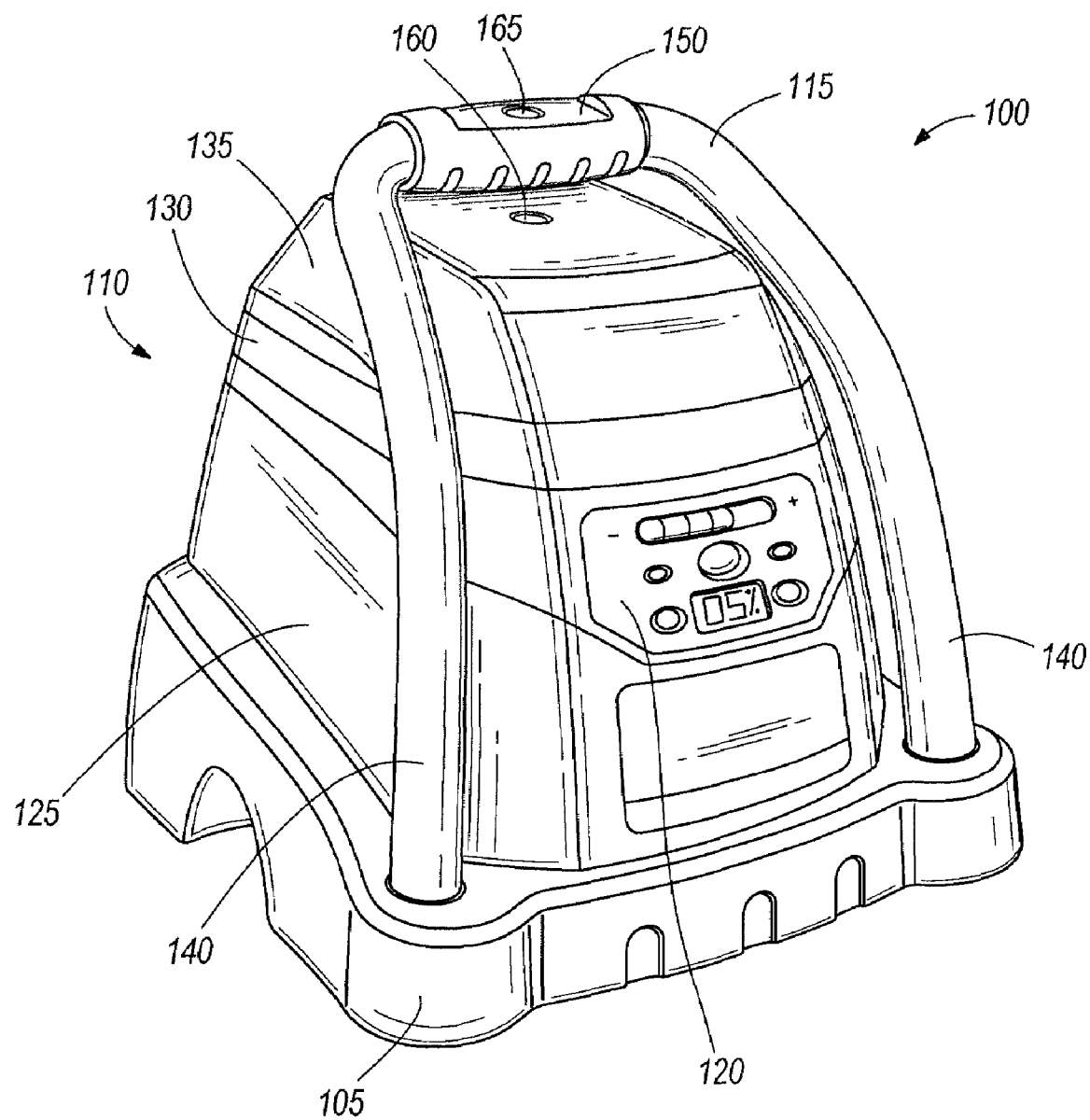
FIG. 1 illustrates a perspective view of an embodiment of a laser level.

FIG. 1 illustrates a perspective view of an embodiment of a laser level 100. The laser level 100 includes a base 105, a housing 110, a handle 115, a control panel 120 having a plurality of indicators and controls, and a laser assembly (not shown).

The housing 110 includes a lower housing 125, a lens 130, and an upper housing 135. In the illustrated embodiment, the housing is manufactured of a plastic material such as high density polyethylene (HDPE).

The laser level 100 is constructed such that the laser level 100 is heavy-duty and/or ruggedized. The construction of the laser level 100 provides rugged durability such that the laser level 100 can function properly following daily transporting, storage in a gang box, being dropped (e.g., from a height of three feet), and being impacted by another object. In addition, the construction of the laser level 100 can protect one or more attached battery packs from damage and can ensure that the battery packs do not break loose as a result of a drop or an impact.

One or more electrical circuits (e.g., a printed circuit board) are suspended and/or mounted within the housing 110. The electrical circuits are secured to the housing 110 in a manner which cushions and protects the electric circuits from an impact. The cushioning may be provided by any elastically deformable material (e.g., rubber washers), positioned between the electric circuits and the housing 110. The mounting configuration also minimizes exposure of the electric circuits to contaminants (e.g. dirt, sand, gravel, sawdust, metal shavings, water, oil, grease, etc.) that may enter the housing 110. Any contaminant entering the housing is directed along an interior wall of the housing 110, depending on the orientation of the housing 110. Therefore, with the electric circuits suspended in the housing 110, contaminants do not contact or come to rest on the circuit portions.

The base 105 is designed to support the laser level 100. The base 105 can be positioned on a surface (e.g., a floor), mounted on a tripod, or supported in another suitable manner (e.g., by a wall bracket). The housing 110 is mounted to the base 105. The base 105 is designed to buffer and cushion a bottom edge of the lower housing 125. The base is blow molded from HDPE or other strong and impact-resistant materials. The base 105 effectively absorbs energy associated with an impact. The base 105 can have a uniform wall thickness of about 0.100 inch. The thickness of the walls is sufficient to help prevent collapse of the base 105 (especially near the corners) when the base 105 is impacted (e.g., as a result of a fall). The base 105 also includes one or more drains, positioned at a low spot molded into the base 105, to release contaminants that may enter the housing 110.

The base 105 can also include bumpers. Front, rear, and side bumpers may be utilized to help protect the housing. The bumpers may absorb some of the energy of an impact, reducing the chance of an attached battery pack becoming loose or components of the laser level 100 being damaged. The bumpers are designed to both absorb and dampen impact energy. The bumpers are made of an elastomeric material, such as polyurethane or natural rubber, to provide springing and damping characteristics to protect the laser level 100 from impacts. The bumpers may also be constructed of other impact-resistant and energy absorbing materials, such as HDPE.

The handle 115 includes one or more arms 140. The handle 115 is connected to or formed with one or both of the housing 110 and the base 105. In the embodiment shown in FIG. 1, the handle 115 is generally positioned towards the front of the laser level 100. The handle 115 forms a protective structure positioned over a portion of the laser level 100.

An ergonomic grip 150 is centrally positioned on the handle 115 to provide a comfortable, steady grip. The grip 150 may include an elastic, non-slip covering to provide comfort while the laser level 100 is carried. The handle 115 allows a user to carry the laser level 100 to and from a work site and also functions as a "roll bar" to protect the laser level 100.

The arms 140 of the handle 115 protect a front surface and portions of side surfaces of the housing 110 from being impacted by another object or surface. The grip 150 of the handle 115 protects the upper housing 135 of the laser level 100 from impact by another object or surface. If the level falls or is impacted, the handle 115 or base 105 may be impacted first, and a combination of the handle 115 and base 105 may help protect the laser level 100.

The laser assembly can be supported by the housing 110. The laser assembly may produce a plurality of laser beams (e.g., four) which may be spread over an angular area (e.g., 360°). In the embodiment of FIG. 1, the laser assembly is a 360° laser assembly operable to generate a desired laser image 360° around the work area. The laser assembly includes overlapping light sources (e.g., diodes) such that any protective or support structures do not obstruct the projected image of the laser beam. In other embodiments, the protective structure may be positionable such that it does not cover a portion of the laser assembly. The laser assembly may be rotatable or fixed.

In the embodiment of FIG. 1, the laser assembly also generates a "dot." An opening 160 (e.g., a lens) is defined in the upper housing 135, and a beam is projected through the opening 160 to generate the dot. A complementary opening 165 through the grip 150 or other structure between the laser and the designated work surface provides a path such that the dot may be generated on a surface above the laser level 100 (e.g., on a ceiling).

The laser assembly may include a single light source (e.g., a diode). In addition, the laser assembly may include multiple light sources (e.g., two diodes spaced 180° apart in a rotating laser assembly) to produce a brighter beam. The laser assembly may also generate a pentagon shape and may include a beam spreader. The laser assembly may be adjustable to change the intensity of the laser image; for example, the laser level 100 may be operable in multiple power modes (e.g., full on, intermediate, and off) to provide a variable intensity laser beam. The power modes can be discrete or can be variable over a range of powers. Such an adjustable intensity laser allows an operator to work under varying lighting conditions (e.g., indoor and outdoor lighting). A switch arrangement (discrete) or a knob (variable) may provide a number of laser intensity levels to vary the intensity of the laser image to accommodate the user's preferences when using the laser level 100 in a given ambient light (e.g., indoor or outdoor).

The laser assembly may be manual-leveling or automatic-leveling. An automatic- or self-leveling laser assembly may be leveled by a servo-motor, gravity (i.e., a pendulum arrangement), etc. The laser level 100 may also be provided with a vibration dampening arrangement to reduce the impact of vibration on the laser assembly. In some embodiments, the automatic leveling is performed by a pendulum-leveling arrangement. In such embodiments, the laser level 100 may include a pendulum lock to hold the pendulum in place when the laser level 100 is in a non-operating condition (e.g., for transport).

A manually-leveled laser level 100 can provide indicators (e.g., bubble levels) of a position of the laser assembly relative to a horizontal reference plane and a vertical reference plane. The laser level 100 also includes mechanisms for adjusting the position of the laser assembly in the horizontal and vertical planes.

The laser assembly can be configured to project the beam through the lens 130. The lens 130 can be constructed of materials that are translucent to the beam. In some embodiments employing a red beam, the lens 130 can be red or clear. In the embodiment shown, the lens 130 extends continuously around the circumference of the housing 110.

The plurality of indicators and controls can be positioned in a single group (e.g., on a control panel as shown in FIG. 1), by functional groups (e.g., multiple control panels), or individually. The control panel 120 includes controls (e.g., keys, knobs, buttons, switches, etc.) which are operable to control operation of the laser level 100 (e.g., program, set-up, adjust, etc.). The controls may be large and/or rugged such that they are easily operated by a user wearing gloves.

The control panel 120 also includes indicators (e.g., light source, LED, display, digital display, audible source, etc.) to provide an indication of operations (e.g., level settings, power supply mode, etc.) of the laser level 100. One or more such indicators provide an indication when the laser level 100 has been leveled and provide an indication when the level and/or the line or dot height of the laser has been changed or altered (e.g., when the laser level 100 is out of level).

Other indicators provide additional indications of a laser level's status (e.g., power supply status). In addition, the control panel 120 includes a digital readout. The digital readout may have several display modes to display information about the operation and/or status of the level. The digital readout may also provide information on other related products and/or accessories in use in the work area (e.g., via a wireless connection). A selector (e.g., a push button or toggle bar) is provided to select the indicator display mode (e.g., program/set-up, operation, charging, etc.).

Figure 2:
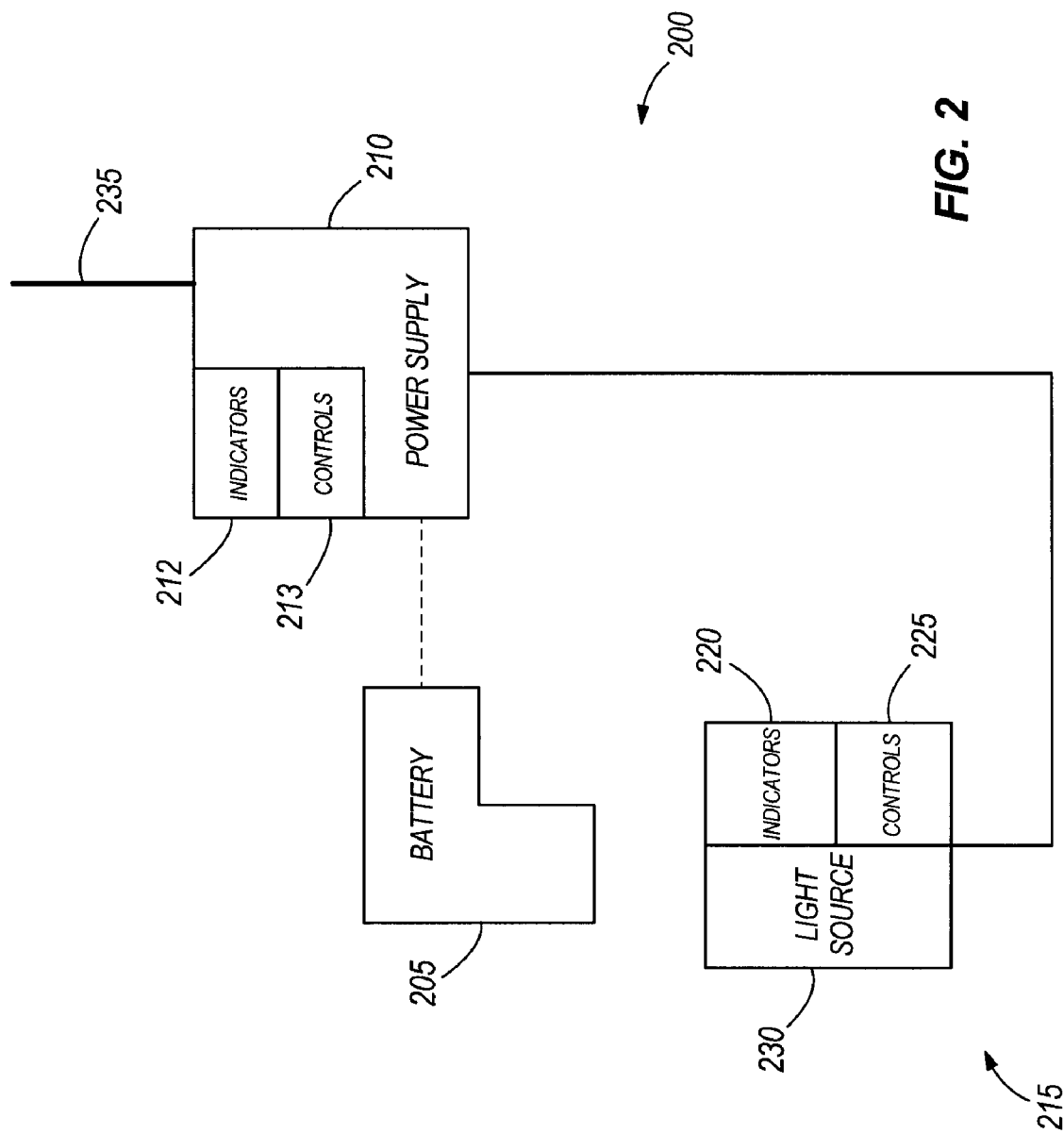
FIG. 2 illustrates a block diagram of an embodiment of a laser level.

FIG. 2 illustrates a block diagram of an embodiment of a laser level 200. The laser level 200 may correspond to the laser level 100 of FIG. 1 or to other implementations of a laser level. The laser level 200 includes a power tool battery 205; a power supply 210 having indicators 212 and controls 213; and a laser assembly 215 having indicators 220, controls 225, and a light source 230.

In some embodiments, the power supply 210 can connect to and receive power from the power tool battery 205. The power tool battery 205 can have a nominal voltage of between 4 V and 50 V and include cells having a chemistry of, for example, NiCd, NiMH, Li-ion, etc. The power supply 210 can be configured to receive power tool batteries 205 having different voltages and/or chemistries and can convert the power provided by attached power tool batteries 205 into the power needed by the laser level 200.

The power tool battery 205 may be similar to power tool battery packs shown and described in U.S. patent application Ser. Nos. 10/719,680, filed Nov. 20, 2003; 10/720,027, filed Nov. 20, 2003; and 10/721,800, filed Nov. 24, 2003; and in U.S. Provisional Patent Application Ser. Nos. 60/574,278, filed May 24, 2004; 60/582,138, filed Jun. 22, 2004; 60/582,728, filed Jun. 24, 2004; 60/582,730, filed Jun. 24, 2004; 60/612,352, filed Sep. 22, 2004; 60/626,013, filed Nov. 5, 2004; and 60/643,396, filed Jan. 12, 2005, the entire contents of all of which are hereby incorporated by reference.

The controls 213 may include a control for selecting a power source (e.g., a first battery, a second battery, a power cord) for the laser level 200. The laser level 200 may also include an automatic re-set control for one or more level operating conditions.

In some embodiments, the housing 110 physically supports the power tool battery 205. A locking arrangement may be provided to selectively lock the power tool battery 205 to the housing 110. The locking arrangement may be similar to the arrangement provided between a power tool battery and an associated power tool, as is known in the art.

In some embodiments, the power supply 210 can also connect to an external power source (e.g., 120 Vac) via a power cord 235. The power supply 210 can convert the power provided by the power tool battery 205 (e.g., a 9.6 Vdc battery) or the power cord 235 into one or more power types (e.g., 5 Vdc) needed by the components (e.g., the laser assembly 215) of the laser level 200.

In some embodiments, the laser level 200 may be selectively powered by the battery 205 or by the external power source. The laser level 200 may automatically select the power source to use, or a control may be provided to enable a user to choose the power source to use. In some embodiments, the power tool battery 205 can operate the laser level 200 for a time period of at least ten hours before requiring recharging.

In some embodiments, the laser level 200 indicators provide an indication of status of the laser level 200 power (e.g., power supply status, battery capacity, power loss, power source).

Figure 3:
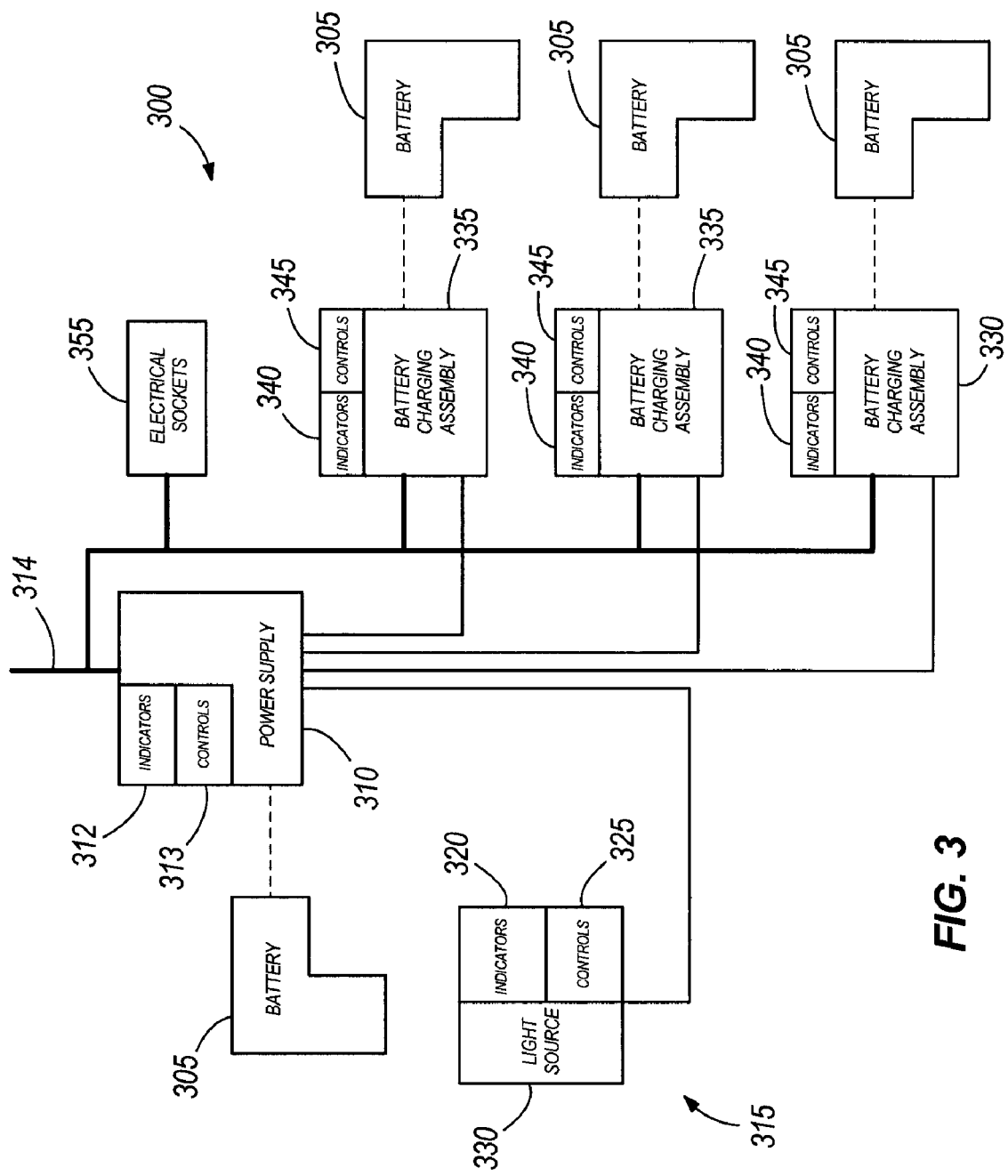
FIG. 3 illustrates a block diagram of an embodiment of a laser level.

FIG. 3 illustrates a block diagram of another embodiment of a laser level 300. One or more power tool batteries 305 can couple to the laser level 300. The laser level 300 includes a power supply 310 having indicators 312 and controls 313; a power cord 314; a laser assembly 315 having indicators 320, controls 325, and a light source 330; at least one battery charging assembly 335 having indicators 340, controls 345, and a battery charging circuit 350; and one or more electrical sockets 355.

The one or more electrical sockets 355 can be positioned on the housing 110 to provide power from the external power source to an external device coupled to the electrical sockets 355. In some embodiments, a plug of the power cord 314 can include a socket for providing power to an external device (e.g., a pass-through outlet/plug).

A housing of the laser level 300 can provide at least one battery port to physically and electrically connect the power tool batteries 305 to the laser level 300. In an exemplary implementation, each battery port includes a battery mounting portion and a terminal assembly. The battery mounting portion includes battery port projections to guide the associated power tool battery 305 as it engages with the port. The battery port projections engage matching grooves on the power tool battery 305 to provide positive alignment with and support of the power tool battery 305. The terminal assembly can include a series of terminals recessed within openings of the port. The terminals are electrically connected to the at least one battery charging circuit 350.

The battery charger assembly and operation may be similar to that shown and described in U.S. Pat. No. 6,222,343, issued Apr. 24, 2001; U.S. Pat. No. 6,456,035, issued Sep. 24, 2002; U.S. Pat. No. 6,605,926, issued Aug. 12, 2003; and U.S. patent application Ser. Nos. 10/719,680, filed Nov. 20, 2003; and 11/139,020, filed May 24, 2005, the entire contents of all of which are hereby incorporated by reference.

The battery ports may electrically couple an attached battery 305 to the power supply 310 to power the laser level 300. The battery ports may electrically couple an attached battery 305 to a battery charging circuit 350 to charge the battery 305. In some embodiments, one or more battery ports may be operating battery ports for powering the laser level 100, and other battery ports may be charging battery ports for charging the batteries 305. In some embodiments, the battery charging assembly 335 can couple an attached battery 305 to the power supply 310 to power the laser level 300.

Each battery port is connected to and/or integrated in the housing in a sturdy manner such that if the laser level 300 falls with one or more batteries 305 attached, the associated port will not break off. The battery ports are designed to survive a fall from about at least four feet with an attached battery 305.

In some embodiments, portions of the laser level 300, through which power is transferred, are formed of flame-retardant material, such as VØ rated plastic. These portions may include the at least one charging assembly 335, the circuit mounting assembly, a power cord assembly, and the battery ports.

In some embodiments, each battery port may also include a terminal cover that may be spring-biased. The terminal cover may prevent contaminants from contacting the terminals on the battery port when a battery 305 is not connected to the port. The cover may also provide a sweeping action to clean the interconnection between the terminals and the battery 305.

In some embodiments, sliding the power tool battery 305 onto the terminal causes the terminal cover to pivotally retract and uncover the openings in the battery port, exposing the terminals to the battery 305. When the power tool battery 305 is removed, the springs may force the cover to pivot back over the terminal. The biasing force on the cover is sufficient to close the cover, but not so strong as to prevent attachment of the battery 305. The cover may move along a path to sweep away contaminants and clean the terminals to ensure a good electrical interconnection between the port and the power tool battery 305. The terminal cover also helps minimize exposure of the terminals to the outside environment. When closed, the cover deflects contaminants away from the terminals to prevent the contaminants from adhering to the terminals and adversely affecting the electrical connection between the battery charging circuit 350 and the power tool battery 305.

In some embodiments, status indicators, such as light-emitting diodes ("LEDs"), are electrically connected with each battery charging circuit 350 to provide information (e.g., the charging status of each battery 305) to the user. The LEDs emit an amount of light necessary to overcome the intensity of outdoor sunlight. The LEDs may be positioned outside of the housing so that the outer perimeter is generally viewable from any direction relative to the housing. In some embodiments, the LED status indicators are bright enough to see in outdoor sunlight and are viewable from a distance and about a wide range of viewing angles. A control may be included that is operable to control charging of one or more battery packs.

In some embodiments, an individual battery charging assembly 335 exists for each power tool battery 305. Independent battery charging circuits 350 increase reliability such that a failure of one battery charging circuit 350 does not result in a complete failure of the laser level 300. In other embodiments, a plurality of power tool batteries 305 are coupled to each battery charging assembly 335.

In some embodiments, the laser level 300 can also include an audio device (e.g., radio, compact disc player, MP3 player) such as shown and described in U.S. Pat. No. 6,982,541, issued Jan. 3, 2006; and U.S. Provisional Application Ser. Nos. 60/379,068, filed May 9, 2002; and 60/344,431, filed on Nov. 9, 2001, the entire contents of all of which are hereby incorporated by reference.

Figure 4:
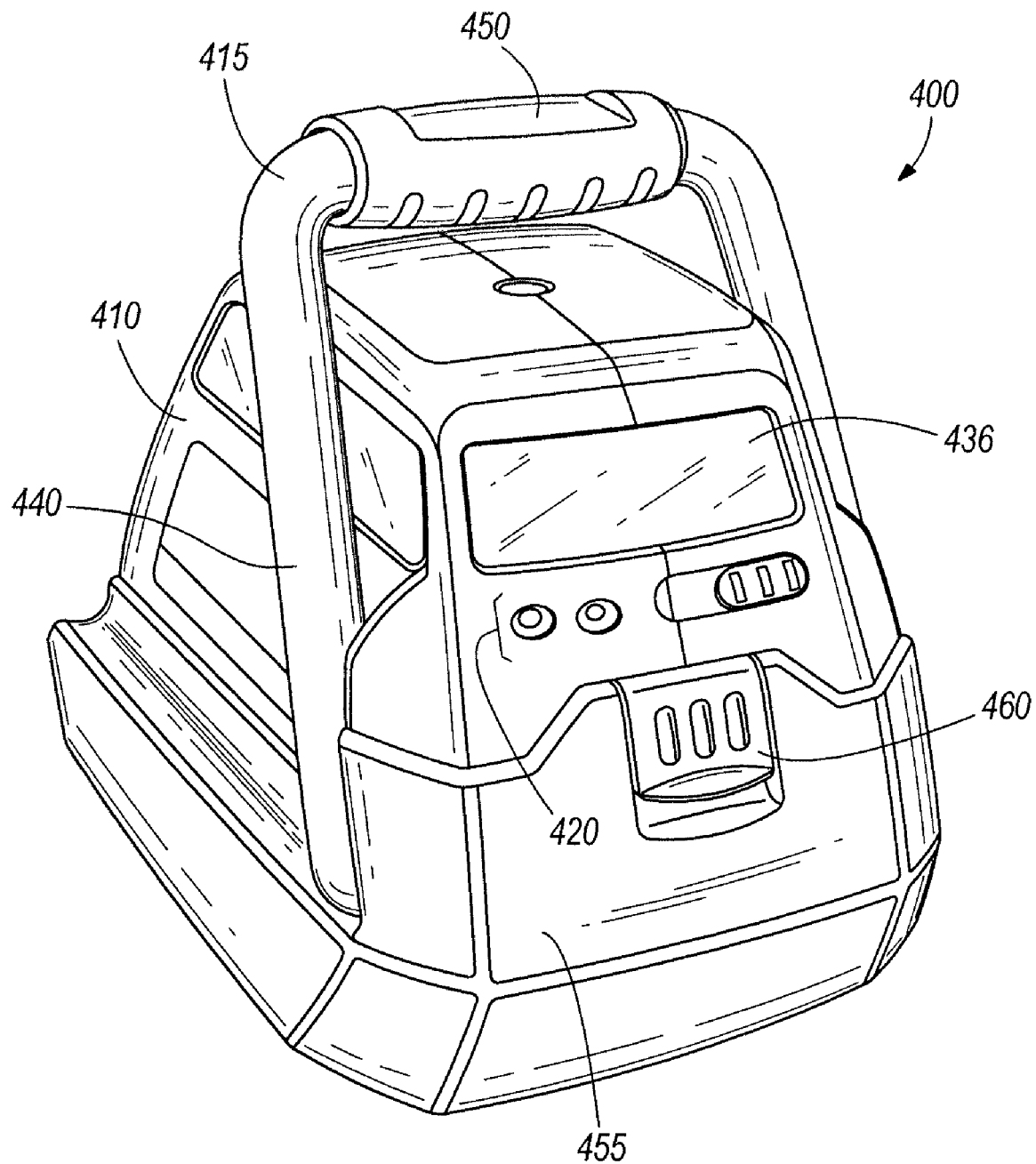
FIG. 4 illustrates a perspective view of an embodiment of a laser level.

FIG. 4 illustrates a perspective view of an embodiment of a laser level 400. The laser level 400 includes a base 405, a housing 410, a handle 415, a control panel 420 having a plurality of indicators and controls, and a laser assembly (not shown). The housing 410 includes a plurality of lenses 436.

The handle 415 includes one or more arms 440. The handle 415 is connected to or formed with one or both of the housing 410 and the base 405. In the embodiment shown in FIG. 4, the handle 415 is generally positioned towards the front of the laser level 400. The handle 415 forms a protective structure positioned over a portion of the laser level 400 to protect the laser level 400.

The handle 415 is rotatably connected to the housing 410 and/or to the base 405 for movement between an upright or carrying position and a lowered storage or operating position (not shown). In some embodiments, the laser level 400 may be operable with the handle in the upright position or in the lowered position. In some embodiments, a biasing or camming mechanism can lock the handle 415 in the upright and/or lowered position, and the handle 415 can move freely between the upright position and the lowered position. An ergonomic grip 450 is centrally positioned on the handle 415 to provide a comfortable, steady grip.

In some embodiments, the housing 410 physically supports a power tool battery. The base 405 includes a door 455 with a latch 460. The latch 460 is biased to lock the door 455 in a closed position. Pressing the latch 460 down unlocks the door 455, allowing the door 455 to be opened or removed. One or more power tool batteries can be inserted into and coupled to the laser level 400 when the door 455 is open. The power tool batteries can provide power to the laser level 400 or can be coupled to a charging circuit for charging by the laser level 400. Closing and latching the door 455 protects and secures the one or more batteries inside the housing 410.

Figure 5:
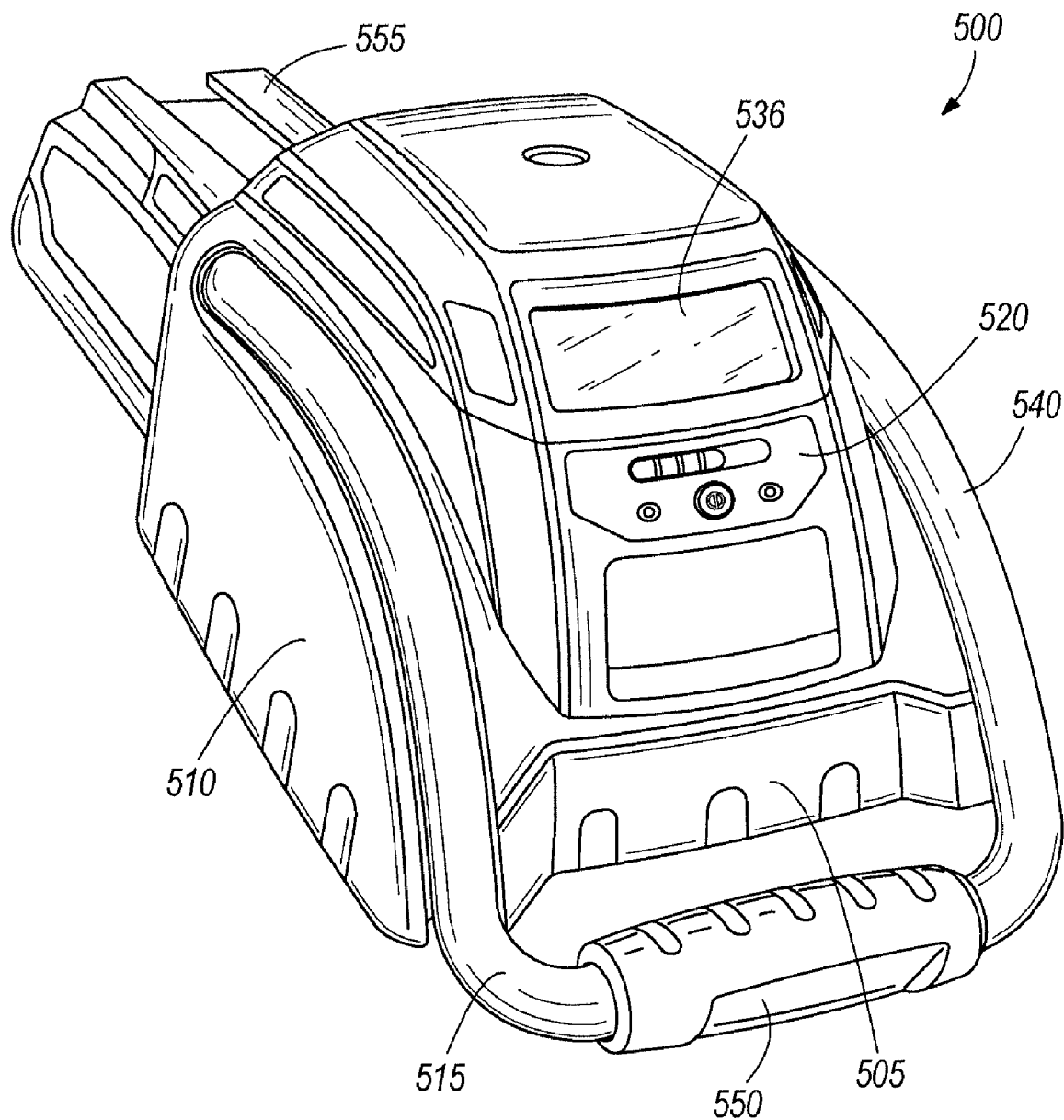
FIG. 5 illustrates a perspective view of an embodiment of a laser level.

FIG. 5 illustrates a perspective view of an embodiment of a laser level 500. The laser level 500 includes a base 505, a housing 510, a handle 515, a control panel 520 having a plurality of indicators and controls, and a laser assembly (not shown). The housing 510 includes a plurality of lenses 536.

The handle 515 includes one or more arms 540. The handle 515 is connected to or formed with one or both of the housing 510 and the base 505. In the embodiment shown in FIG. 5, the handle 515 is generally positioned towards the front of the laser level 500. The handle 515 forms a protective structure positioned over a portion of the laser level 500 to protect the laser level 500.

The handle 515 is rotatably connected to the housing 510 and/or to the base 505 for movement between an upright or carrying position (not shown) and a lowered storage or operating position. In some embodiments, the laser level 500 may be operable with the handle in the upright position or in the lowered position. In some embodiments, a biasing or camming mechanism can lock the handle 515 in the upright and/or lowered position, and the handle 515 can move freely between the upright position and the lowered position. An ergonomic grip 550 is centrally positioned on the handle 515 to provide a comfortable, steady grip.

In some embodiments, the housing 510 physically supports a power tool battery 555. A locking arrangement may be provided to selectively lock the power tool battery 555 to the housing 510. The locking arrangement may be similar to an arrangement provided between a power tool battery and an associated power tool, as is known in the art.

Figure 6:
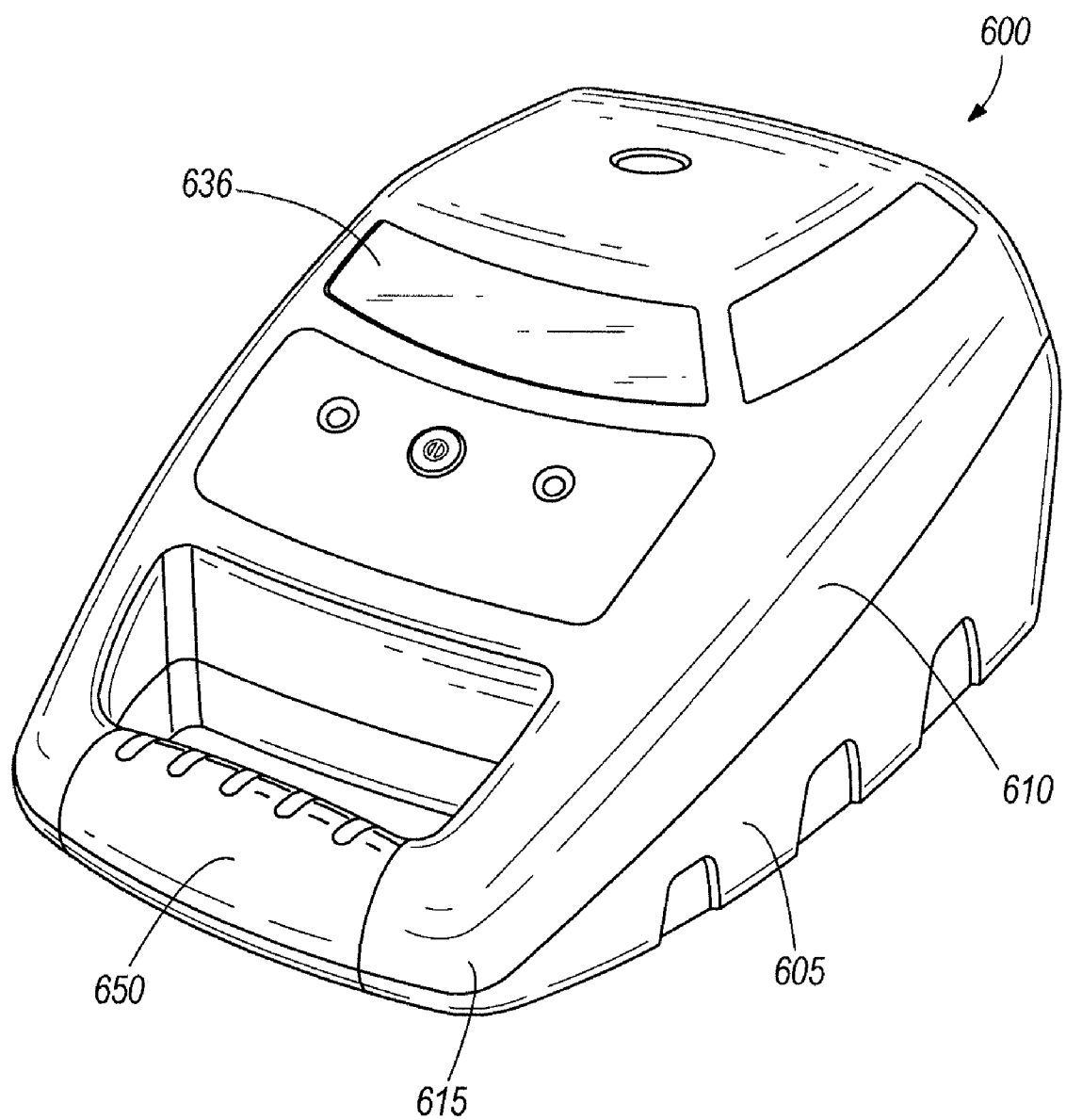
FIG. 6 illustrates a perspective view of an embodiment of a laser level.

FIG. 6 illustrates a perspective view of an embodiment of a laser level 600. The laser level 600 includes a base 605, a housing 610, a handle 615, a plurality of indicators and controls, and a laser assembly (not shown). The housing 610 includes a plurality of lenses 636.

The handle 615 is integrally formed with one or both of the housing 610 and the base 605. In the embodiment shown in FIG. 6, the handle 615 is generally positioned towards the front of the laser level 600. The handle 615 forms a protective structure positioned over a portion of the laser level 600 to protect the laser level 600. An ergonomic grip 650 is centrally positioned on the handle 615 to provide a comfortable, steady grip.

Figure 7:
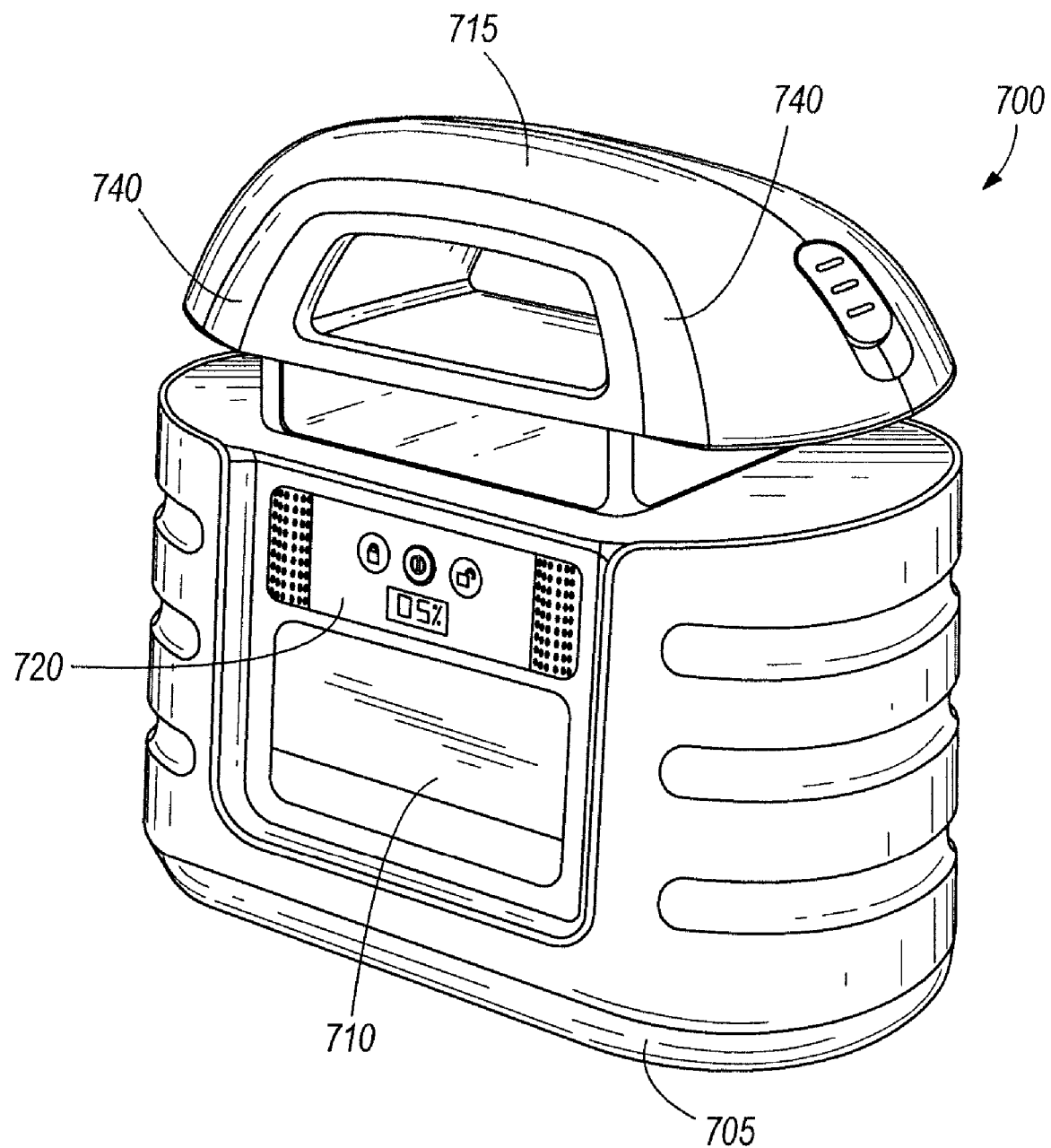
FIG. 7 illustrates a perspective view of an embodiment of a laser level.

FIG. 7 illustrates a perspective view of an embodiment of a laser level 700. The laser level 700 includes a base 705, a housing 710, a handle 715, a control panel 720 having a plurality of indicators and controls, and a laser assembly (not shown). The housing 710 includes a plurality of lenses 736.

The handle 715 includes one or more arms 740. The handle 715 is connected to or formed with one or both of the housing 710 and the base 705. In the embodiment shown in FIG. 7, the handle 715 is generally positioned towards the top of the laser level 700. The handle 715 forms a protective structure positioned over a portion of the laser level 700 to protect the laser level 700.

Figure 8:
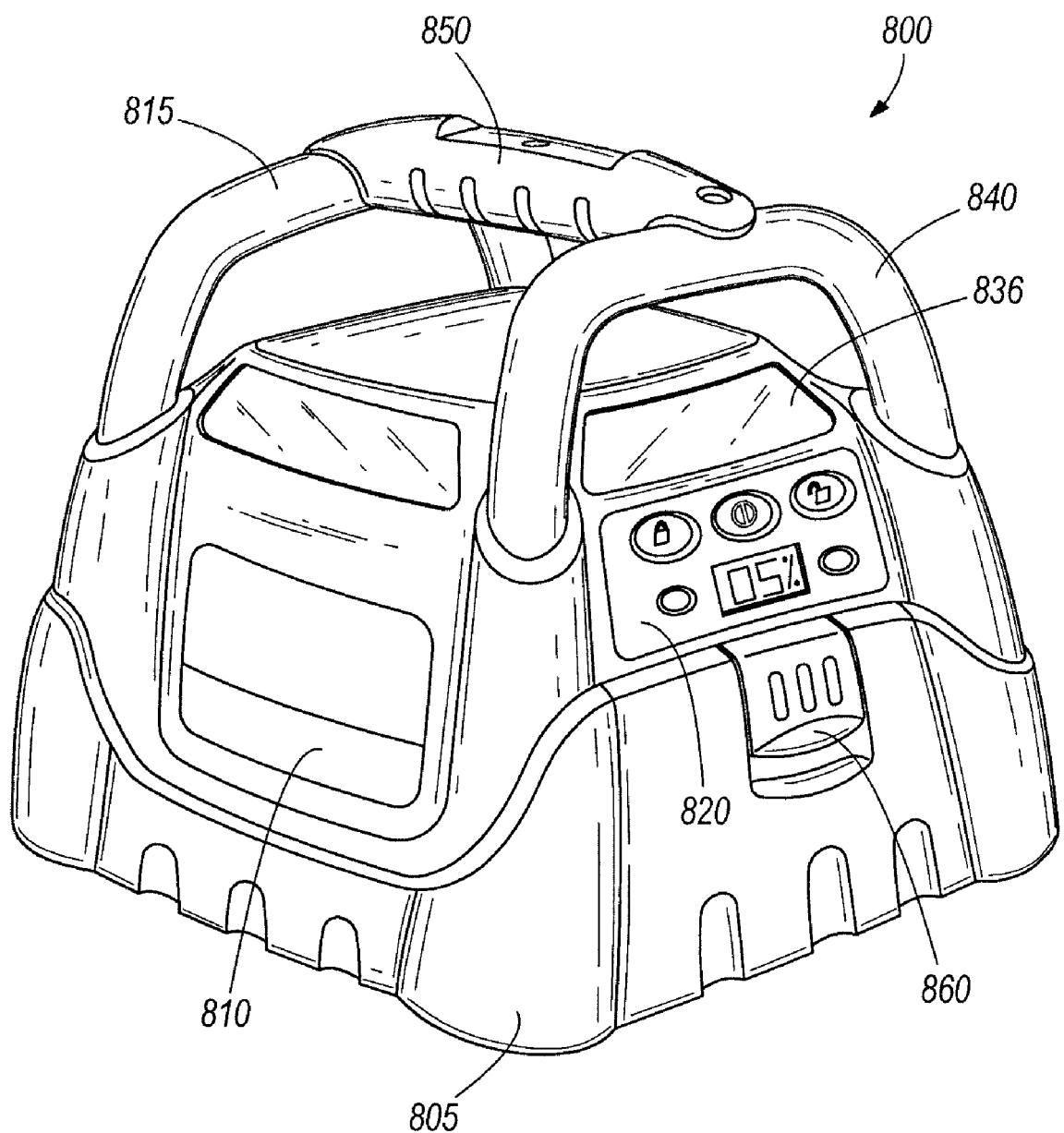
FIG. 8 illustrates a perspective view of an embodiment of a laser level.
Figure 10:
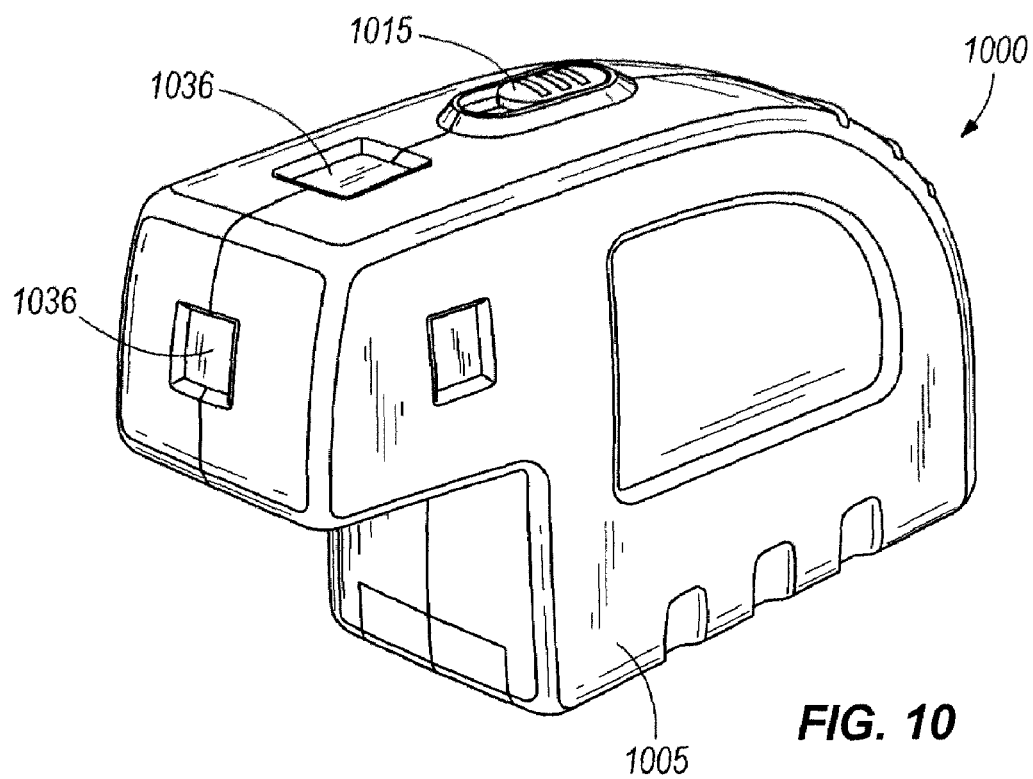
FIG. 10 illustrates a perspective view of an embodiment of a laser level.
Figure 11:
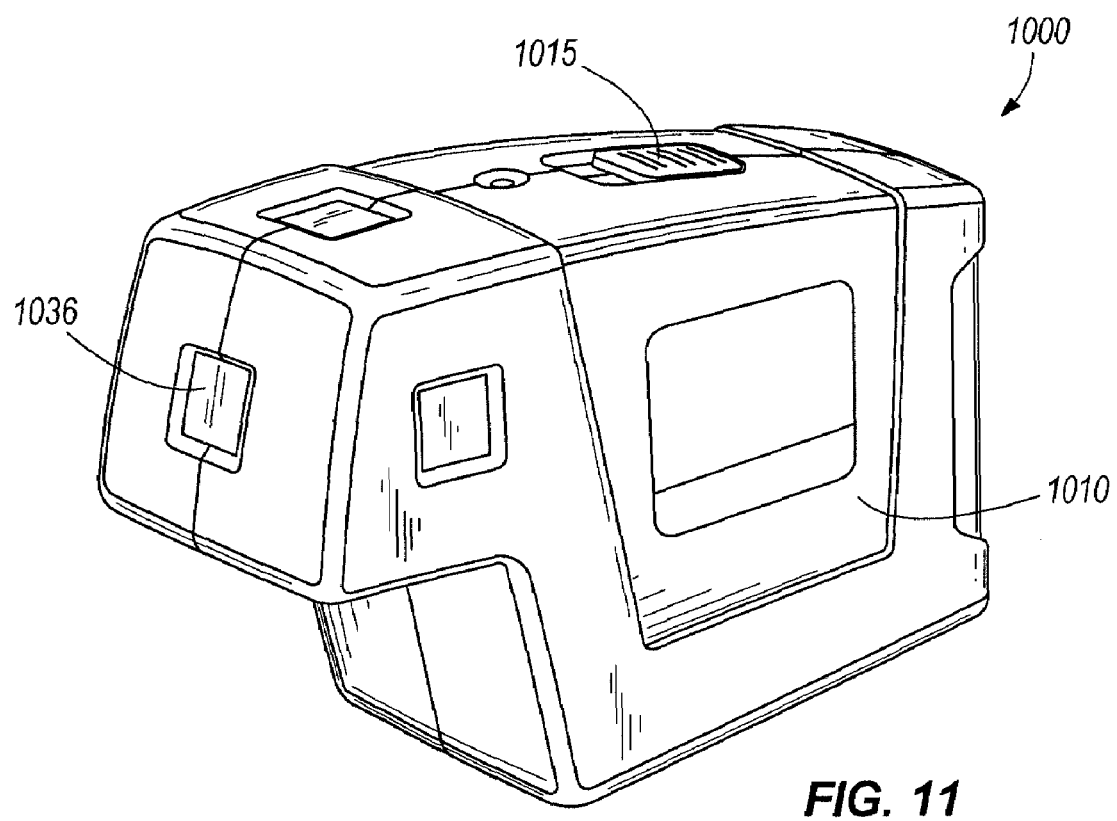
FIG. 11 illustrates a perspective view of an embodiment of a laser level.
Figure 12:
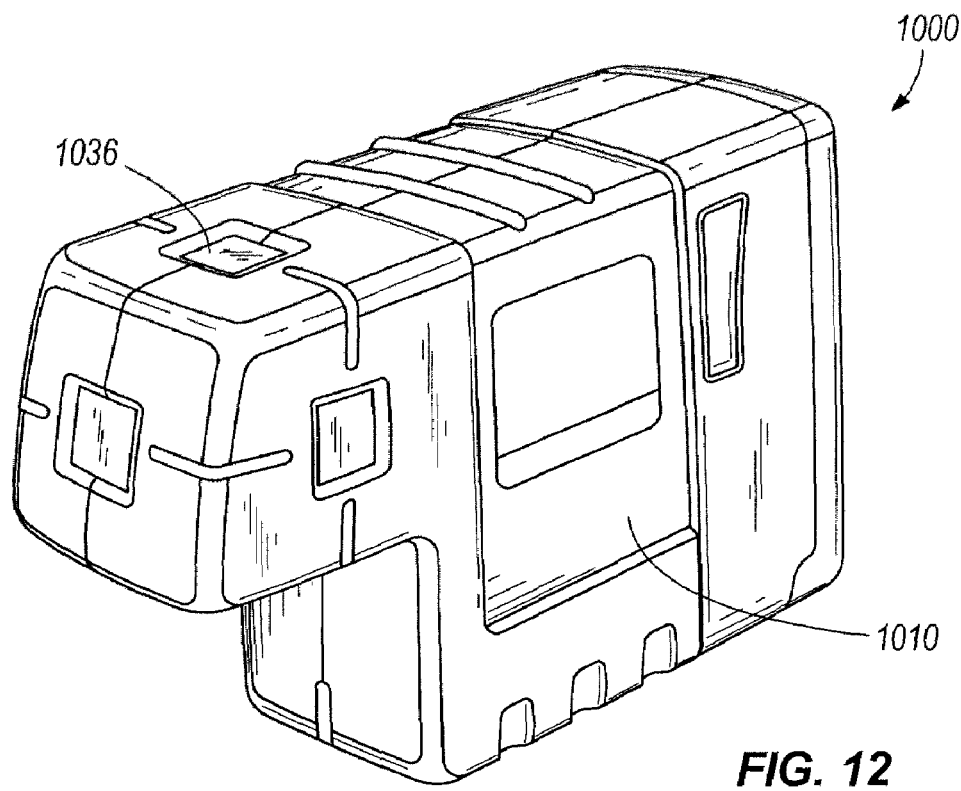
FIG. 12 illustrates a perspective view of an embodiment of a laser level.
Figure 13:
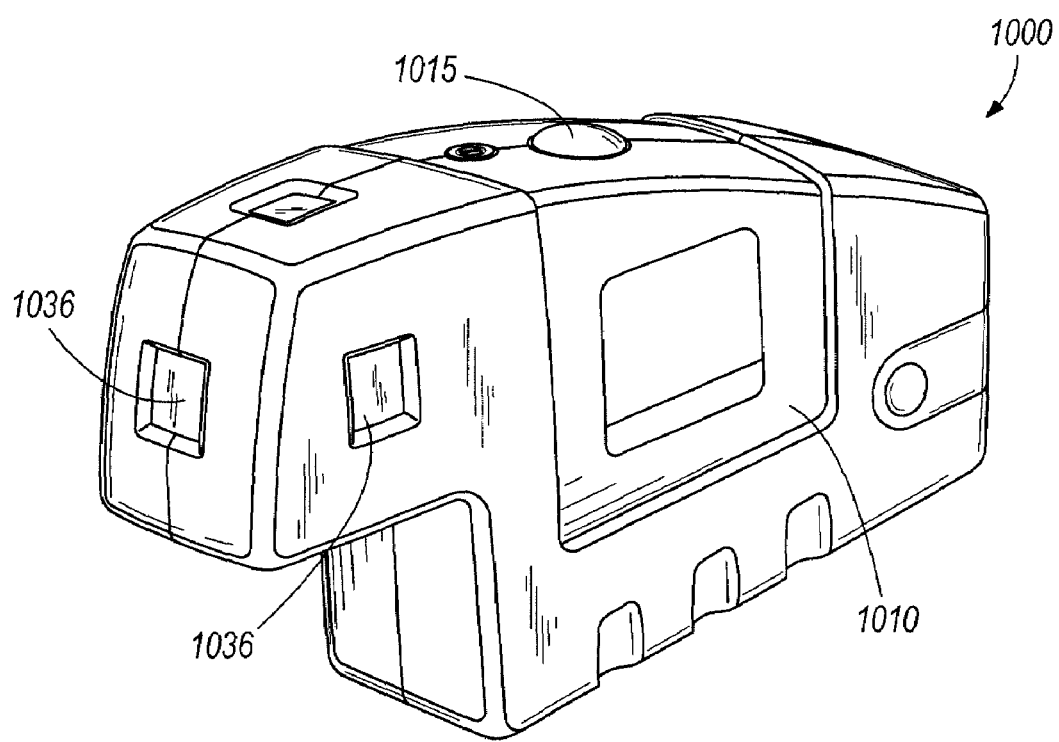
FIG. 13 illustrates a perspective view of an embodiment of a laser level.

FIG. 8 illustrates a perspective view of an embodiment of a laser level 800. The laser level 800 includes a base 805, a housing 810, a handle 815, a control panel 820 having a plurality of indicators and controls, and a laser assembly (not shown). The housing 810 includes a plurality of lenses 836.

The handle 815 includes one or more arms 840. The handle 815 is connected to or formed with one or both of the housing 810 and the base 805. In the embodiment shown in FIG. 8, the handle 815 is generally positioned towards the top of the laser level 800. The handle 815 forms a protective structure positioned over a portion of the laser level 800 to protect the laser level 800. An ergonomic grip 850 is centrally positioned on the handle 815 to provide a comfortable, steady grip.

In some embodiments, the housing 810 physically supports a power tool battery. The base 805 is detachable from the housing 810 and is held in position by a latch 860. The latch 860 is biased to lock the base 805. Pressing the latch 860 down unlocks the base 805, allowing the base 805 to be removed. One or more power tool batteries can be inserted into and coupled to the laser level 800 when the base 805 is removed. The power tool batteries can provide power to the laser level 800 or can be coupled to a charging circuit for charging by the laser level 800. Closing and latching the base 805 protects and secures the at least one battery inside the housing 810.

FIGS. 9A-9C illustrate perspective views of an embodiment of a laser level 900. The laser level 900 includes a base 905, a housing 910, a handle 915, a plurality of indicators and controls, and a laser assembly (not shown). The housing 910 includes a plurality of lenses 936.

The handle 915 is integrally formed with one or both of the housing 910 and the base 905. In the embodiment shown in FIG. 9, the handle 915 is generally positioned towards the front of the laser level 900. The handle 915 forms a protective structure to protect the laser level 900.

As shown in FIG. 9B, the laser level 900 may be positioned in another orientation (e.g., on its side) to project a beam in a different plane, for example, to generate the beam on a floor and ceiling of the work area.

In some embodiments, the housing 910 physically supports a power tool battery. The base 905 includes a door 955 with a latch 960. The latch 960 is biased to lock the door 955. Pressing the latch 960 down unlocks the door 955, allowing the door 955 to be opened or removed. One or more power tool batteries can be inserted into and coupled to the laser level 900 when the door 955 is open. The power tool batteries can provide power to the laser level 900 or can be coupled to a charging circuit for charging by the laser level 900. Closing and latching the door 955 protects and secures the at least one battery inside the housing 910.

FIGS. 10-14 illustrate perspective views of embodiments of a laser level 1000. The laser level 1000 is a point or dot (e.g., five point/dot) laser assembly. The laser level 1000 includes a base 1005, a housing 1010, an on/off switch 1015, and a laser assembly (not shown). The housing 1010 includes a plurality of lenses 1036.

In some embodiments, the housing 1010 physically supports a power tool battery. The power tool battery can provide power to the laser level 1000. The housing 1010 protects and secures the at least one battery inside the housing 1010.

In the illustrated embodiments, the laser level 1000 is a point or dot laser assembly operable to generate one or more dots in the work area. The dot-generating laser level 1000 provides a dot or plumb laser level (e.g., a five position level).

The laser level 1000 may include a floor marking device to produce a "dot" on the floor of the work area. The floor marking device may produce a floor dot, for example, by dispensing chalk, other marking material, etc., on the floor at the designated location.

Figure 14:
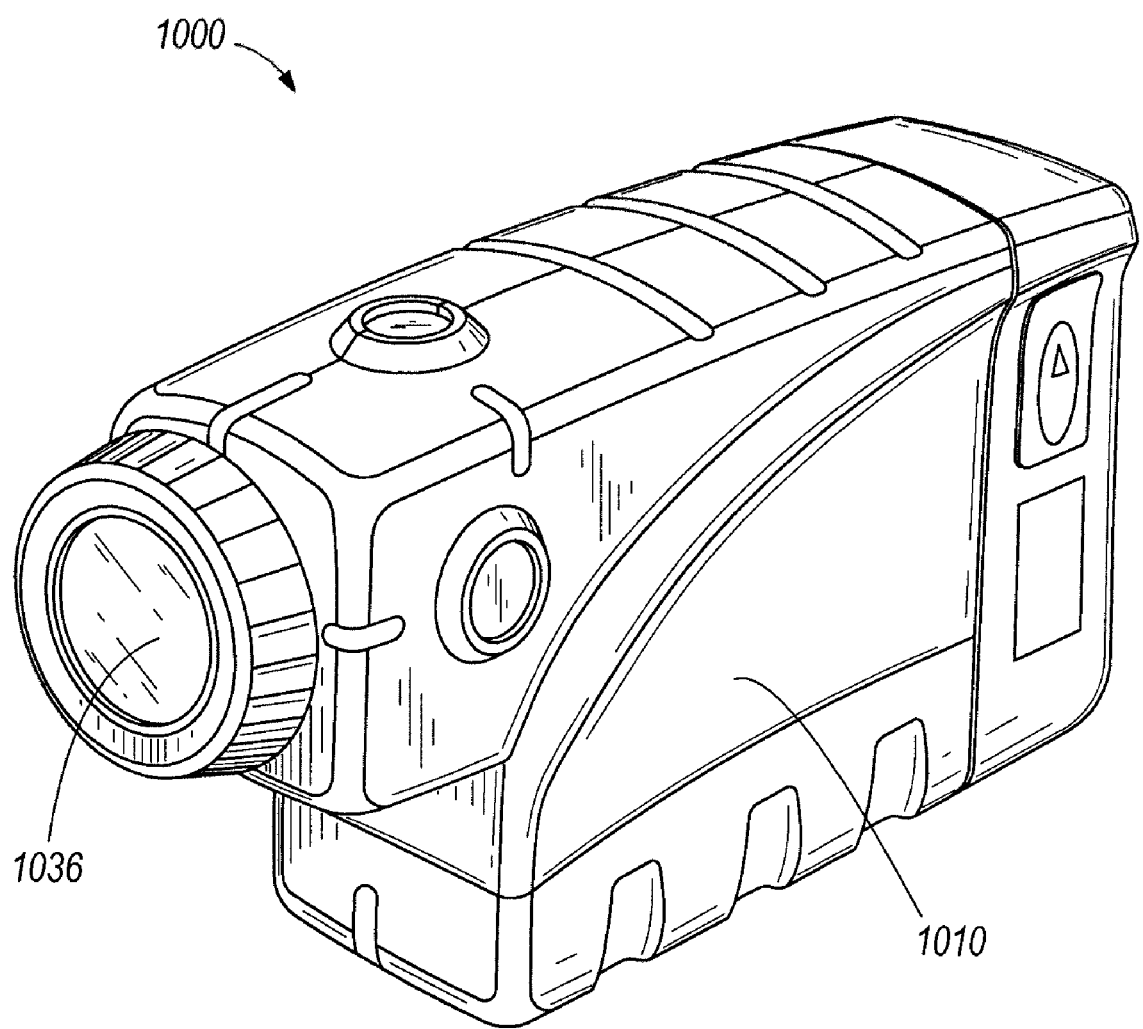
FIG. 14 illustrates a perspective view of an embodiment of a laser level.

In the embodiment shown in FIG. 14, an adjustable lens 1040 may be operable to change an image of a beam projected on an external surface between an angular laser (i.e., a line) and a point/dot, line/dot. Rotating the lens 1040 causes the image of the beam to widen (e.g., when rotating the lens 1040 clockwise) from a point/dot to a line, or to narrow (e.g., when rotating the lens 1040 counterclockwise) from a line to a point/dot.

In some embodiments of the invention (e.g., embodiments similar to or different from the embodiments described above in connection with FIGS. 1-14), a protective structure may include a solid wall that extends from an outer surface of a housing and surrounds surfaces of one or more battery packs to recess the battery packs into the wall and still provide access to the battery packs. A cover or multiple covers may enclose or partially enclose the battery packs to protect them from impact. The cover or multiple covers may be removable or retractable manually or by insertion of a battery pack.

In some embodiments, one or more vents may be defined in a housing of a laser level. The structure of the vents helps to prevent any solid (i.e., dirt, sand, sawdust, metal shavings, etc.) or liquid (i.e., water, oil, grease, etc.) contaminants from entering the housing. Heat, generated by any electrical circuits during operation of the laser level, is removed by natural convection. Cooling air is drawn, through one or more lower vents, into the housing and flows across the electrical circuits. The air is heated as it passes over and cools the electrical circuits. The heated air then rises and escapes from the housing through one or more upper vents.

In some embodiments, the laser assembly may also provide a combination of options (e.g., measure a distance, angle, etc.) for a user.

In some embodiments, a laser level may include a drop down laser assembly/lens unit or may include a laser unit cover to protect a laser assembly.

Various features and advantages of the invention are set forth in the following claims.

What is claimed is:

1. A laser level comprising:
    a housing;
    a protective structure associated with the housing and configured to protect the laser level and a power tool battery removably attached to the housing from an impact;
    at least one light source, supported by the housing and configured to project at least one beam of visible light onto a surface external to the laser level;
    at least one indicator configured to indicate a position of the housing relative to a vertical plane and a horizontal plane; and
    at least one of a first outlet integrated in the housing and a second outlet integrated into a plug of a power cord of the laser level, the first and second outlets configured to provide power from the power cord to an external device interfaced therewith.

2. A laser level comprising:
    a housing;
    a protective structure associated with the housing and configured to protect the laser level and a power tool battery removably attached to the housing from an impact;
    at least one light source, supported by the housing and configured to project at least one beam of visible light onto a surface external to the laser level;
    at least one indicator configured to indicate a position of the housing relative to a vertical plane and a horizontal plane; and
    a plurality of charging circuits for charging a plurality of power tool batteries, the plurality of charging circuits operating independently of each other.

3. The laser level of claim 2, wherein the plurality of charging circuits are configured to charge batteries having a plurality of battery chemistries and a plurality of nominal voltages.

4. A battery charger comprising:
    a housing configured to support a power tool battery that is removably interfaced with the battery charger;
    a power cord;
    a charging circuit supported by the housing and electrically connectable to a power source and to the battery, the charging circuit configured to provide charging current to the battery; and
    a light source configured to project at least one beam of visible light onto a surface external to the battery charger.

5. The battery charger of claim 4, further comprising a protective structure associated with the housing and configured to protect the battery charger from an impact.

6. The battery charger of claim 5, wherein the protective structure is configured to protect the removable interfaced battery.

7. The battery charger of claim 4, wherein the light source is configured to be automatically positioned such that the at least one beam of visible light is projected on at least one of a vertical plane and a horizontal plane.

8. The battery charger of claim 4, wherein power is provided to the battery charger by at least one of a power tool battery and the power cord connected to the power source.

9. The battery charger of claim 4, further comprising an audio device.

10. The battery charger of claim 4, further comprising at least one of a first outlet integrated in the housing and a second outlet integrated into a plug of the power cord of the battery charger, the first and second outlets configured to provide power from the power cord to an external device interfaced therewith.

11. The battery charger of claim 4, further comprising one or more indicators configured to provide at least one of an indication of a low-battery condition and an indication that the battery charger has been moved out of level.

12. The battery charger of claim 4, wherein the beam is at least one of a dot, a line, a five point beam, and a continuous line projected 360 degrees around the battery charger.

13. The battery charger of claim 4, wherein the laser level is operable in a plurality of power modes to adjust a brightness of the at least one beam.

14. The battery charger of claim 4, further comprising a plurality of charging circuits for charging a plurality of power tool batteries, the plurality of charging circuits operating independently of each other.

15. The battery charger of claim 14, wherein the plurality of charging circuits are configured to charge batteries having a plurality of battery chemistries and a plurality of nominal voltages.

16. The battery charger of claim 4, wherein power is provided by a battery supplying a voltage between 4V and 50V.

17. The battery charger of claim 4, further comprising a plurality of light sources configured to provide overlapping beams such that the beams form a continuous visible line that is not obstructed by a structure of the battery charger.

18. A power tool comprising:
a housing;
a base having a plurality of bumpers constructed of an impact absorbing material;
a handle having at least one arm and a grip;
a light source supported by the housing and configured to project a beam of visible light onto a surface external to the tool; and
at least one charging circuit supported by the housing, each charging circuit electrically connectable to a power source and at least one removably interfaced battery, and configured to provide a charging current to the at least one battery.

19. The power tool of claim 18, further comprising at least one of a first outlet integrated in the housing and a second outlet integrated into a plug of the power cord of the power tool, the first and second outlets configured to provide power from the power cord to an external device interfaced therewith.

20. The power tool of claim 18, further comprising one or more indicators configured to provide at least one of an indication of a low-battery condition and an indication that the power tool has been moved out of level.

* * * * *